(12) United States Patent　(10) Patent No.: US 9,874,273 B2
Kobayashi et al.　(45) Date of Patent: Jan. 23, 2018

(54) METHOD OF MANUFACTURING A FLEXIBLE EXTERNALLY TOOTHED GEAR FOR STRAIN WAVE GEARING

(71) Applicant: Harmonic Drive Systems Inc., Shinagawa-ku (JP)

(72) Inventors: Masaru Kobayashi, Azumino (JP); Daisuke Orii, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 369 days.

(21) Appl. No.: 14/611,304

(22) Filed: Feb. 2, 2015

(65) Prior Publication Data

US 2015/0240930 A1　Aug. 27, 2015

(30) Foreign Application Priority Data

Feb. 26, 2014　(JP) ................................. 2014-035921

(51) Int. Cl.
　　*C21D 9/32*　(2006.01)
　　*C21D 1/22*　(2006.01)
　　(Continued)

(52) U.S. Cl.
　　CPC ........... *F16H 55/0833* (2013.01); *C21D 1/22* (2013.01); *C21D 6/002* (2013.01); *C21D 6/005* (2013.01);
　　(Continued)

(58) Field of Classification Search
None
See application file for complete search history.

(56) References Cited

U.S. PATENT DOCUMENTS

| 4,343,661 A | * | 8/1982 | Rice | .......................... C21D 1/20 148/586 |
| 5,562,785 A | * | 10/1996 | Yamanaka | ............... B21H 5/02 148/573 |

(Continued)

FOREIGN PATENT DOCUMENTS

| JP | 2005-69402 A | 3/2005 |
| JP | 2006-57684 A | 3/2006 |

(Continued)

OTHER PUBLICATIONS

Machine-English translation of JP03-111551, Hanakawa Katsunori et al., May 13, 1991.*

(Continued)

*Primary Examiner* — Deborah Yee
(74) *Attorney, Agent, or Firm* — Buchanan Ingersoll & Rooney PC

(57) ABSTRACT

A method for manufacturing a flexible externally toothed gear includes: a first step (ST1) for producing a primary molded article by performing near-net-shape plastic working on a material comprising a nickel-free low-alloy steel having a silicon content of 1.45-1.5 wt %; a second step (ST2) for martempering the primary molded article; a third step (ST3) for producing a secondary molded article from the primary molded article; and a fourth step (ST4) for shot-peening the secondary molded article to change the surface portions of the tooth part and other parts to martensite. A flexible externally toothed gear can be obtained in which the surface hardness is kept within a prescribed range and the fatigue strength and abrasion resistance are high.

12 Claims, 3 Drawing Sheets

(51) Int. Cl.
  *F16H 55/06* (2006.01)
  *F16H 55/08* (2006.01)
  *C21D 6/00* (2006.01)
  *C21D 8/00* (2006.01)
  *C22C 38/02* (2006.01)
  *C22C 38/04* (2006.01)
  *C22C 38/22* (2006.01)
  *C22C 38/34* (2006.01)
  *C22C 38/38* (2006.01)
  *C21D 7/06* (2006.01)
  *F16H 49/00* (2006.01)

(52) U.S. Cl.
  CPC ............... *C21D 6/008* (2013.01); *C21D 7/06* (2013.01); *C21D 8/005* (2013.01); *C21D 9/32* (2013.01); *C22C 38/02* (2013.01); *C22C 38/04* (2013.01); *C22C 38/22* (2013.01); *C22C 38/34* (2013.01); *C22C 38/38* (2013.01); *C21D 2211/008* (2013.01); *F16H 55/06* (2013.01); *F16H 2049/003* (2013.01)

(56) References Cited

U.S. PATENT DOCUMENTS 7,249,536 B2    7/2007  Kiyosawa et al.
2013/0000788 A1  1/2013  Nagata et al.

FOREIGN PATENT DOCUMENTS

JP   2009-156462 A    7/2009
WO   WO 2011/122315   10/2011

OTHER PUBLICATIONS

Machine-English translation of JP02-200727, Mitsuhayashi Masahiko et al., Aug. 9, 1990.*

* cited by examiner (a)

(b)

(c)

US 9,874,273 B2

METHOD OF MANUFACTURING A FLEXIBLE EXTERNALLY TOOTHED GEAR FOR STRAIN WAVE GEARING

FIELD OF THE INVENTION

The present invention relates to a flexible externally toothed gear for a strain wave gearing and a method for manufacturing the same, and more particularly to a flexible externally toothed gear having increased fatigue strength and abrasion resistance. The invention further relates to a method for manufacturing the flexible externally toothed gear.

BACKGROUND ART

Flexible externally toothed gears, which are component parts of strain wave gearings typically used as reducers, are known to have flattened-cylinder, cup-shaped, or top-hat-shaped configurations. JP-A 2006-57684 discloses a flat strain wave gearing, JP-A 2005-69402 discloses a cup-shaped strain wave gearing, and JP-A 2009-156462 discloses a top-hat-shaped strain wave gearing.

The flexible externally toothed gears for these strain wave gearings are manufactured using specialty thermal-refined steel having exceptional mechanical strength. The surface hardness of thin-walled flexible externally toothed gears needing highly precise machining is HRC30-HRC50.

WO 2011/122315 proposes a method for manufacturing a wave gear base material used in the manufacture of a flexible externally toothed gear. In the manufacturing method described in this document, it is disclosed that a flexible externally toothed gear is manufactured through steps for hot-forging, rotary cutting, gear cutting, and shot-peening. It is also disclosed that steel having a carbon content of 0.5% or less is used as the metal material. It is furthermore disclosed that a primary molded article formed from the steel is heated before being rapidly cooled to a temperature higher than the martensite start temperature (Ms temperature) so that the main phase of the metal structure will be bentonite, or that the primary molded article is heated before being rapidly cooled to the martensite region and then tempered so that the main phase of the metal structure will be sorbite. It is also disclosed that it is possible to stably obtain, as a wave gear base material, a primary molded article having excellent properties in terms of both the necessary spring characteristics and ductility and the cutting and machining properties preferred for gear cutting and machining.

Patent Document 1: JP-A 2006-57684
Patent Document 2: JP-A 2005-69402
Patent Document 3: JP-A-2009-156462
Patent Document 4: WO 2011/122315

SUMMARY OF THE INVENTION

Increased usage torque and improved durability are in especially high demand in strain wave gearings. In instances such as when an existing strain wave gearing is to be replaced, it is desirable for the new strain wave gearing to have higher usage torque and improved durability without any change in size or shape. Therefore, it is essential to raise the fatigue strength and abrasion resistance of a thin-walled flexible externally toothed gear as a component part of a strain wave gearing without causing an accompanying increase in size or change in shape. In order to maintain the machining properties of the flexible externally toothed gear, it is preferable to keep the surface hardness thereof within a range of HRC30-HRC50, similar to the existing products, and increase the fatigue strength and abrasion resistance.

In view of the above, an object of the present invention is to propose a method for manufacturing a flexible externally toothed gear in which the surface hardness can be kept within a prescribed range and the fatigue strength and abrasion resistance can be higher than in an existing product of the same size and shape.

Another object of the present invention is to provide a flexible externally toothed gear having exceptional fatigue strength and abrasion resistance and having a surface hardness kept within the same range as that of an existing product of the same size and shape.

In order to achieve the objects stated above, according to the present invention, there is provided a method for manufacturing a flexible externally toothed gear for a cup-shaped or top-hat-shaped strain wave gearing, the method comprising:

a first step for producing a cup-shaped or top-hat-shaped primary molded article approximating the shape of a flexible externally toothed gear for a strain wave gearing by performing near-net-shape plastic working on a material comprising a low-alloy steel not containing nickel as an alloy element;

a second step for martempering the primary molded article;

a third step for producing a secondary molded article by performing turning and gear-cutting on the martempered primary molded article, the secondary molded article having a diaphragm part and a tooth part formed thereon; and a fourth step for shot-peening the secondary molded article to change the metal structure of the surface layer portion of the tooth part and the diaphragm part to martensite.

According to the present invention, there is also provided a method for manufacturing a flexible externally toothed gear for a flat strain wave gearing, the method comprising:

a first step for producing a cylindrical primary molded article approximating the shape of a flexible externally toothed gear for a strain wave gearing by performing near-net-shape plastic working on a material comprising a low-alloy steel not containing nickel as an alloy element;

a second step for martempering the primary molded article;

a third step for producing a secondary molded article by performing turning and gear-cutting on the martempered primary molded article, the secondary molded article having a tooth part formed thereon; and a fourth step for shot-peening the secondary molded article to change the metal structure of the surface layer portion of the tooth part to martensite.

In the manufacturing method of the present invention, martempering is employed as the process for heating the primary molded article produced using nickel-free low-alloy steel. This makes it possible to deliberately cause an austenite structure to remain in the metal structure of the heated primary molded article. Shot-peening the surface portion of the tooth part and other parts makes it possible to change the main phase of the metal structure of the surface layer portions to a martensite structure (plasticity-induced phase transformation), raise the hardness of the surface layer portions, and increase the compressive residual stress. Furthermore, when high stress is impressed on the inside of the thin-walled flexible externally toothed gear, the residual austenite structure on the inside is reinforced by being transformed to a martensite structure, and the fatigue strength of the flexible externally toothed gear can be increased.

The inventors confirmed through experimentation that a flexible externally toothed gear manufactured according to the present invention had a root fatigue strength and state of tooth-surface abrasion that were both far superior to those of an existing specialty thermal-refined steel product of the same size and shape having similar surface hardness. Accordingly, according to the manufacturing method of the present invention, it is possible to manufacture a flexible externally toothed gear having raised fatigue strength and abrasion resistance as well as consistently excellent machining properties. Using this flexible externally toothed gear makes it possible to achieve increased usage torque and improved durability in a strain wave gearing of the same size and shape as an existing product.

EMBODIMENT FOR CARRYING OUT THE INVENTION

Figure 1:
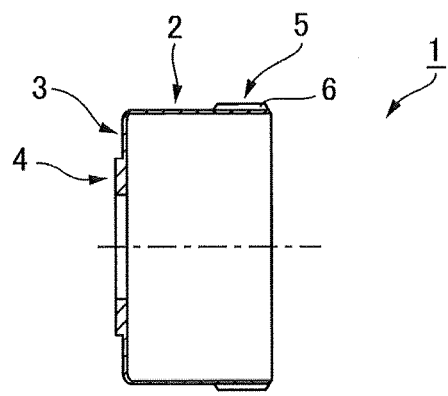
FIG. 1 is a vertical cross-sectional view of a cup-shaped flexible externally toothed gear, a vertical cross-sectional view of a top-hat-shaped flexible externally toothed gear, and a vertical cross-section of a cylindrical flexible externally toothed gear to which the present invention can be applied.
Figure 1:
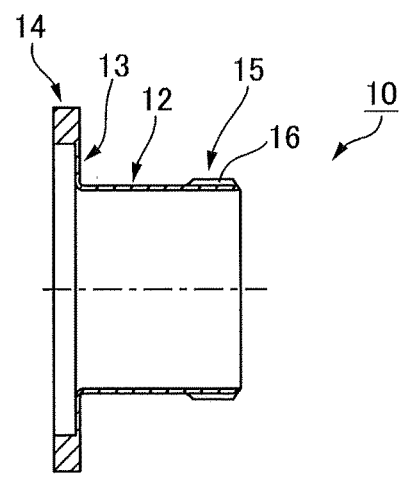
Figure 1:
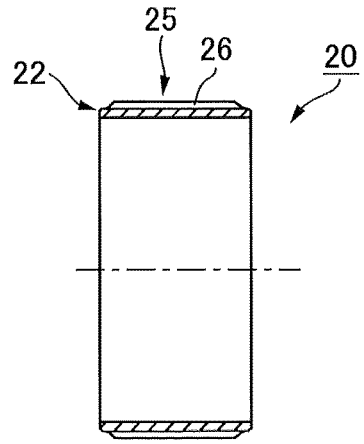

A method for manufacturing a flexible externally toothed gear for a strain wave gearing to which the present invention is applied is described below with reference to the annexed drawings.

(Flexible Externally Toothed Gear)

First, a flexible externally toothed gear for a strain wave gearing will be described with reference to FIG. 1. As shown in FIG. 1(a), a cup-shaped flexible externally toothed gear 1 is provided with a radially flexible thin-walled cylindrical barrel part 2, a flexible thin-walled diaphragm part 3 extending radially inward from one end of the cylindrical barrel part 2, a thick-walled discoid boss part 4 formed integrally with the center portion of the diaphragm part 3, and a tooth part 5 on the side at the other end of the cylindrical barrel part 2, an outer tooth 6 being formed on the tooth part 5.

The top-hat-shaped flexible externally toothed gear 10 shown in FIG. 1(b) is provided with a thin-walled flexible cylindrical barrel part 12, a thin-walled flexible diaphragm part 13 spreading radially outward from one end of the cylindrical barrel part 12, a thick-walled discoid boss part 14 formed integrally with the outer circumferential edge of the diaphragm part 13, and a tooth part 15 on the side at the other end of the cylindrical barrel part 12, an outer tooth 16 being formed on the tooth part 15.

By contrast, the cylindrical flexible externally toothed gear 20 used in a flat strain wave gearing and shown in FIG. 1(c) is provided with a thin-walled flexible cylindrical barrel part 22, and a tooth part 25 formed on the cylindrical barrel part 22, an outer tooth 26 being formed on the tooth part 25.

(Method for Manufacturing Flexible Externally Toothed Gear)

Figure 2:
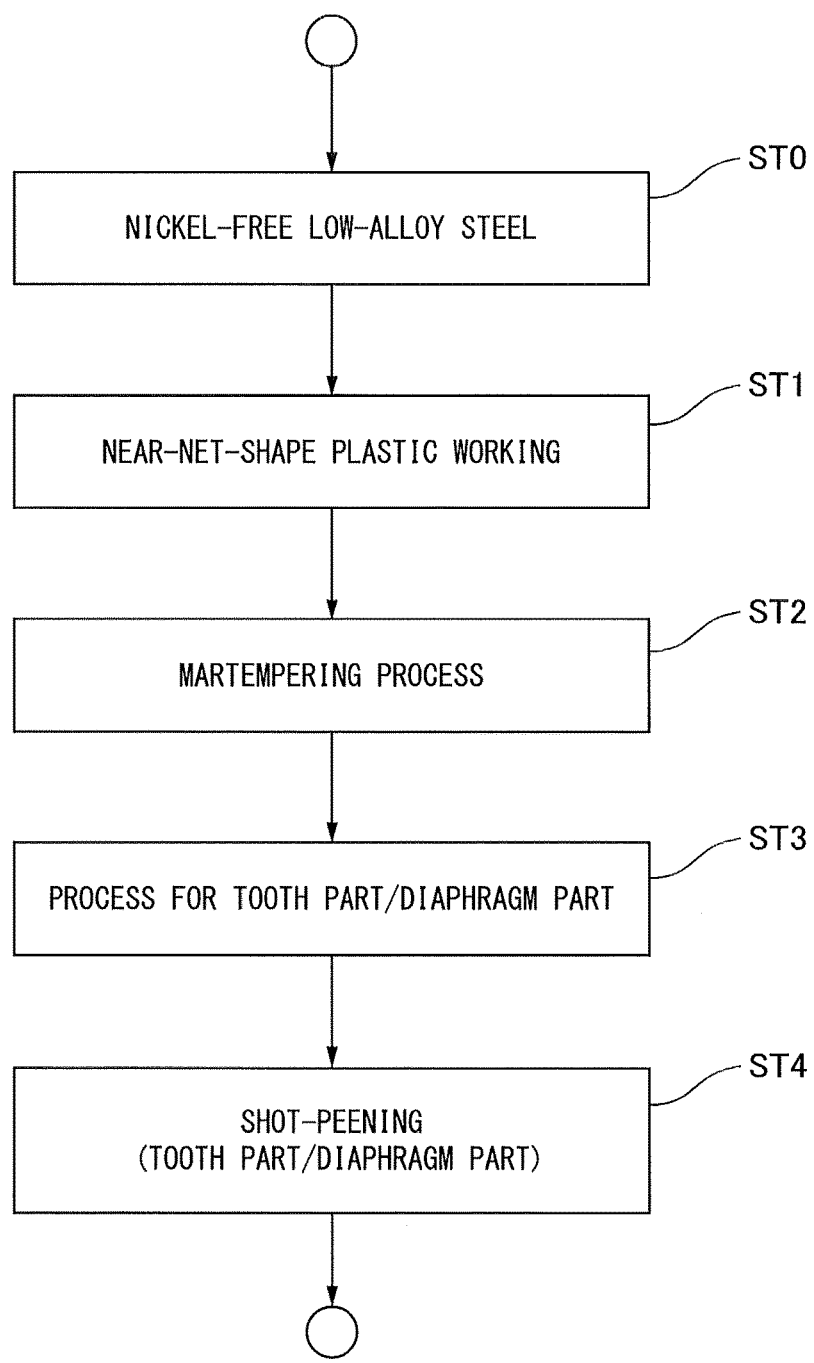
FIG. 2 is an overview process diagram showing the main steps for manufacturing a cup-shaped or top-hat-shaped flexible externally toothed gear.

FIG. 2 is an overview process diagram showing the main steps for manufacturing the cup-shaped flexible externally toothed gear 1 (or the top-hat-shaped flexible externally toothed gear 10). The following description will be made with reference to FIG. 2. First, a material comprising a low-alloy steel is prepared in a preliminary step ST0. The low-alloy steel used in the present invention does not contain nickel, and has an Si content of 1.45-1.5 wt %. The alloy element components and combination ratios (in percentage by weight) for a low-alloy steel suitable for use in the present invention are shown below.

TABLE 1

| | Component | | | | | |
|---|---|---|---|---|---|---|
| | C | Si | Mn | Cr | Mo | Ni |
| Weight % | 0.18-0.23 | 1.45-1.5 | 1.4-1.7 | 0.8-1.1 | 0-0.2 | — |

Note:
P: ≤0.05 wt %;
S: ≤0.03 wt %;
Mo: depends on thickness of near-net-shape plastic-worked product.

In order to generate stable residual austenite by martempering as described below (second step), Si has an inhibitive effect on carbide (cementite) precipitation on the grain boundary for un-transformed austenite. Mo improves quenching performance, inhibits tempering brittleness, improves high-temperature strength, and exhibits other such effects.

Next, in a first step ST1, a cup-shaped (top-hat-shaped) primary molded article approximating the shape of a flexible externally toothed gear 1 (10) is produced by performing near-net-shape plastic working on a prepared nickel-free low-alloy steel material. Forging and drawing can be employed as methods for performing the near-net-shape plastic working. Even when using high-deformation-resistant cold-forging, the molding load necessary when performing near-net-shape plastic working on an existing product using specialty steel may be increased by up to approximately 15-20%.

Figure 3:
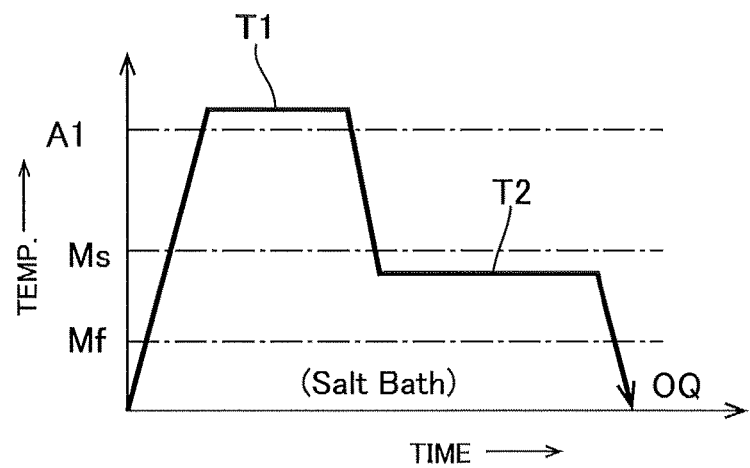
FIG. 3 is a graph showing the martempering process.

Next, in a second step ST2, the produced primary molded article is martempered. The following description is made with reference to the continuous cooling transformation curve (CCT curve) schematically shown in FIG. 3. The primary molded article is heated by martempering to a quenching temperature T1 (equal to or greater than an A1 transformation temperature) for changing the main phase of the metal structure of the primary molded article to austenite. Afterward, the heated primary molded article is cooled from the quenching temperature T1 to a temperature T2 (between the martensite start temperature Ms and the martensite finish temperature Mf) directly below the martensite start temperature Ms, and is then subjected to isothermal transformation (in a salt bath or the like) at this temperature. Next, the primary molded article is cooled to a temperature lower than Mf.

Martempering makes it possible to deliberately cause 8-15 vol % of metastable austenite to remain in the metal structure of the primary molded article. A temperature within a range of 290-400° C. (a temperature between Ms-117° C. and Ms) is preferred as the martempering temperature.

Next, in the third step ST3 in FIG. 2, a secondary molded article is produced by turning and gear-cutting the primary molded article heated as described above, the secondary molded article having a diaphragm part 3 (13) and a tooth part 5 (15) formed thereon. Afterwards, in the fourth step ST4, the secondary molded article is shot-peened to change the metal structure of the surface layer portion of the diaphragm part 3 (13) and the tooth part 5 (15) to martensite. Performing plasticity-induced phase transformation to change the surface layer portions of the diaphragm part 3 (13) and the tooth part 5 (15) to martensite increases the hardness and compressive residual stress of the surface layer portions of the diaphragm part 3 (13) and the tooth part 5 (15).

Multistage shot-peening in which at least two stages of shot-peening are performed is preferred as the shot-peening process in the fourth step ST4. This makes it possible to reinforce shallow portions of the surface layer portions of the diaphragm part 3 (13) and the tooth part 5 (15), the shallow portions lying below the surface by a distance corresponding to two or three times the crystal grain diameter. Specifically, when at least a prescribed amount of force or more is applied to the inside of the metal structure by an outside force, the austenite remaining on the inside transforms to martensite, reinforcing the structure. The fatigue strength of the flexible externally toothed gear is thereby improved.

A cup-shaped flexible externally toothed gear 1 (10) manufactured using such steps is formed from low-alloy steel having a Si content of 1.45 to 1.5 wt %, but does not contain nickel as an alloy element. The main phase of the metal structure of the flexible externally toothed gear inner layer portion has soft martensite interspersed in a martempered bainitic-ferrite parent phase, the metal structure having 8-15 vol % of metastable residual austenite remaining therein. The main phase of the metal structure of at least those surface layer portions of the flexible externally toothed gear pertaining to the diaphragm part 3 (13) and the tooth part 5 (15) is a shot-peened induced-transformation martensite structure.

As described above, in the present invention, Ni-free steel of an inexpensive grade is used as a material, and heating process conditions and manufacturing sequencing for raising the fatigue strength of a flexible externally toothed gear are employed in the steps for producing the flexible externally toothed gear.

Specifically, in the first step, hot- and cold-forging and other processes are performed in primary molding, whereby the diameters of the crystal grains in the metal structure of a primary molded article are 20 μm or less. That is to say, the first step involves a method for performing primary molding that contributes to the stabilizing of residual austenite produced by martempering in the following second step.

In the heating process of the following second step, after annealing in the gamma region at a temperature equal to or greater than the A1 transformation temperature, martempering is employed in which isothermal transformation (in a salt bath or the like) is performed at a temperature between Ms and Mf and then cooling (oil cooling or the like) is performed. This process makes it possible to obtain a metal structure in which soft martensite is mixed in a bainitic-ferrite parent structure. Because 8-15 vol % of metastable residual austenite remains in the metal structure even at room temperature, the hardness can be set to HRC30-50. This facilitates the turning and gear-cutting processes in the following third step.

In the fourth step, shot-peening is performed at necessary positions on the product in a nearly-finished shape after gear-cutting. This makes it possible to increase the hardness and the compressive residual stress near the product surface by using the transformation-induced plasticity of the 8-15 vol % of residual austenite. As a result, a flexible externally toothed gear having high fatigue strength can be obtained.

In addition, strain hardening (mainly dislocation hardening) is used as a method for hardening structural steel in the prior art. However, the martempered steel in the present invention undergoes strain-induced transformation hardening from residual austenite and phase stress hardening (resulting from differences in deformation strength between the hard phase and the soft phase), in addition to strain hardening. Accordingly, the method of the present invention has an advantage in that the range of increased hardening is greater than in the prior art.

Residual stress in the structural steel of the prior art is generated by plastic strain. However, the present invention has an advantage in that stress resulting from differences in deformation strength between the residual-austenite phase and the parent phase caused by plastic strain, stress resulting from transformation strain, and stress generated by internal stress on the circumference of the strain-transformed martensite are added to the residual stress generated by plastic strain, and greater compressive residual stress is generated.

Other Embodiments

The manufacturing method described above can also be used as a method for manufacturing the cylindrical flexible externally toothed gear 20 shown in FIG. 1(*c*).

The invention claimed is:

1. A method for manufacturing a flexible externally toothed gear for a strain wave gearing, the method comprising:
   a first step for producing a cup-shaped or top-hat-shaped primary molded article approximating a shape of the flexible externally toothed gear for the strain wave gearing by performing near-net-shape plastic working on a material comprising nickel-free low-alloy steel having a silicon content of 1.45-1.5 wt % and a carbon content of 0.18-0.23 wt %;
   a second step for martempering the primary molded article so that a hardness thereof is set to HRC 30 to 50;
   a third step for producing a secondary molded article by performing turning and gear-cutting on the martempered primary molded article, the secondary molded article having a diaphragm part and a tooth part formed thereon; and
   a fourth step for shot-peening the secondary molded article to change a metal structure of a surface layer portion of the tooth part and the diaphragm part to martensite.

2. The method for manufacturing a flexible externally toothed gear for a strain wave gearing according to claim 1, wherein
   the martempering temperature in the second step is set to a value within a range from 290° C. to 400° C.

3. The method for manufacturing a flexible externally toothed gear for a strain wave gearing according to claim 1, wherein
   the martempering temperature in the second step is set to a value within a range from the martensite start temperature Ms to a temperature 117° C. lower than the temperature Ms.

4. The method for manufacturing a flexible externally toothed gear for a strain wave gearing according to claim 1, wherein
   the shot-peening in the fourth step is multistage shot-peening in which at least two stages of shot-peening are performed.

5. The method for manufacturing a flexible externally toothed gear for a strain wave gearing according to claim 1, wherein
the near-net-shape plastic working in the first step is forging or drawing.

6. The method for manufacturing a flexible externally toothed gear for a strain wave gearing according to claim 2, wherein
the near-net-shape plastic working in the first step is forging or drawing, and
the shot-peening in the fourth step is multistage shot-peening in which at least two stages of shot-peening are performed.

7. A method for manufacturing a flexible externally toothed gear for a strain wave gearing, comprising:
   a first step for producing a cylindrical primary molded article approximating a shape of the flexible externally toothed gear for the strain wave gearing by performing near-net-shape plastic working on a material comprising nickel-free low-alloy steel having a silicon content of 1.45-1.5 wt % and a carbon content of 0.18-0.23 wt %;
   a second step for martempering the primary molded article so that a hardness thereof is set to HRC 30 to 50;
   a third step for producing a secondary molded article by performing turning and gear-cutting on the martempered primary molded article, the secondary molded article having a tooth part formed thereon; and
   a fourth step for shot-peening the secondary molded article to change a metal structure of a surface layer portion of the tooth part to martensite.

8. The method for manufacturing a flexible externally toothed gear for a strain wave gearing according to claim 7, wherein
the martempering temperature in the second step is set to a value within a range from 290° C. to 400° C.

9. The method for manufacturing a flexible externally toothed gear for a strain wave gearing according to claim 7, wherein
the martempering temperature in the second step is set to a value within a range from the martensite start temperature Ms to a temperature 117° C. lower than the temperature Ms.

10. The method for manufacturing a flexible externally toothed gear for a strain wave gearing according to claim 8, wherein
the shot-peening in the fourth step is multistage shot-peening in which at least two stages of shot-peening are performed.

11. The method for manufacturing a flexible externally toothed gear for a strain wave gearing according to claim 7, wherein
the near-net-shape plastic working in the first step is forging or drawing.

12. The method for manufacturing a flexible externally toothed gear for a strain wave gearing according to claim 8, wherein
the near-net-shape plastic working in the first step is forging or drawing, and
the shot-peening in the fourth step is multistage shot-peening in which at least two stages of shot-peening are performed.

* * * * *